United States Patent
Young

(10) Patent No.: US 8,116,045 B2
(45) Date of Patent: Feb. 14, 2012

(54) CIRCUITRY AND METHODOLOGY FOR PROTECTING A BOOST DC/DC CONVERTER

(75) Inventor: Eric Stephen Young, Apex, NC (US)

(73) Assignee: Linear Technology Corporation, Milpitas, CA (US)

( * ) Notice: Subject to any disclaimer, the term of this patent is extended or adjusted under 35 U.S.C. 154(b) by 466 days.

(21) Appl. No.: 12/358,568

(22) Filed: Jan. 23, 2009

(65) Prior Publication Data

US 2010/0188784 A1    Jul. 29, 2010

(51) Int. Cl.
*H02H 9/00* (2006.01)
(52) U.S. Cl. .......................................................... 361/18
(58) Field of Classification Search .................... 361/18; 327/589
See application file for complete search history.

(56) References Cited

U.S. PATENT DOCUMENTS

| | | | | |
|---|---|---|---|---|
| 5,612,610 A * | 3/1997 | Borghi et al. ................. | 323/222 |
| 6,043,705 A * | 3/2000 | Jiang ............................. | 327/589 |
| 6,798,178 B1 * | 9/2004 | Bayadroun .................... | 323/274 |
| 2003/0076051 A1 * | 4/2003 | Bowman et al. ........... | 315/200 A |
| 2006/0181244 A1 * | 8/2006 | Luo et al. ...................... | 320/128 |
| 2007/0257861 A1 | 11/2007 | Zhang et al. | |
| 2008/0149167 A1 * | 6/2008 | Liu ................................ | 136/248 |

OTHER PUBLICATIONS

"36V Low Cost High Side Current Sense in a SOT-23" pp. 1-12, LT6106 Linear Technology Corporation 2007.
"Full-Featured LED Driver with 2.3A Switch Current" pp. 1-20, LT3518 Linear Technology Corporation 2007.
"Overvoltage Protection Regulator and Inrush Limiter" pp. 1-20, LT4356-1 Linear Technology Corporation 2007.

* cited by examiner

*Primary Examiner* — Jared Fureman
*Assistant Examiner* — Tien Mai
(74) *Attorney, Agent, or Firm* — McDermott Will & Emery LLP

(57) ABSTRACT

Protection circuitry protects a boost converter coupled between input and output nodes for driving a load coupled to the output node. The protection circuitry may comprise a first circuit configured for monitoring a voltage at the output node, the voltage being caused by a signal having a voltage proximate to, or lower than, an input voltage of the boost converter. The protection circuitry may also include a second circuit configured for coupling together the input node with respect to the output node and enabling the boost converter only if the monitored voltage exceeds a reference voltage.

10 Claims, 4 Drawing Sheets

CIRCUITRY AND METHODOLOGY FOR PROTECTING A BOOST DC/DC CONVERTER

TECHNICAL FIELD

This disclosure relates to power supply systems, and more particularly, to circuitry for protecting a boost DC/DC converter.

DESCRIPTION OF RELATED ART

A DC/DC boost converter is useful for driving, for example, an LED module which has a forward voltage greater than an input voltage of the converter. FIG. 1 is a circuit diagram showing a typical DC/DC boost converter. Converter 10 shown in FIG. 1 includes inductor L, transistor (switch) M, diode D, output capacitor C, and PWM modulator U. When transistor M is on, an input voltage $V_{IN}$ is forced across inductor L which causes current through it to ramp up. When transistor M is off, the decreasing inductor current forces the end of inductor L coupled to transistor M to swing positive. This forward biases diode D, allowing capacitor C to charge up to a voltage that is higher than input voltage $V_{IN}$. During the switch off time, the inductor current flows into both output capacitor C and the load, such as an LED module. When the switch is on, load current is supplied only by capacitor C.

When, for example, an output node to which the LED module is coupled is short-circuited to ground, the cathode of diode D is connected to ground, resulting in high current from the input node to the output node through the components of the DC/DC boost converter, and very likely damaging the components or an input supply. This may arise because, in many applications, the LED module may be connected to a driver circuit through a plug-in socket, and thus, may relatively easily separate from the driver circuit. Because of the plug-in socket and potential exposure of leads of the LED module to the environment, the boost converter needs to be protected from inadvertent shorts on the terminals of the LED module.

The simplest method for providing the boost converter with protection involves placing a fuse element or a PTC resistor in series with the input supply. One example of a PTC resistor is POSISTOR® of Murata Manufacturing Co., Ltd. of Kyoto, Japan. This technique suffers from the drawback that the fuse element may be a one time actuation type or if not, may drain the supply during a sustained ground fault event. Further, a fuse or PTC presents a voltage drop/efficiency loss and limits the power to the LED module. Available PTC resistor values may be impractical for the needs of the LED driver.

A more sophisticated active method for protecting the boost converter from an output fault involves sensing an input current and controlling a pass device (e.g., N-channel MOSFET) between the input supply and the boost converter to either regulate or interrupt the input current when the input current exceeds a predetermined level. Implementation of such a method is well known, e.g., see commercially available LT 4356-1"Overvoltage Protection Regulator and Inrush Limiter," manufactured by Linear Technology Corporation, and described in its corresponding datasheet, incorporated herein by reference. The LT 4356 device can be placed in series with the input supply to control an N-channel MOSFET when an input current exceeds a reference value. This method can further be improved because the pass element (e.g., N-channel MOSFET) may have a large thermal dissipation during a sustained output fault to ground, and also because a sustained fault would draw large currents from the supply which may be a battery.

The subject matter described herein addresses, but is not limited to, the above shortcomings.

SUMMARY OF DISCLOSURE

Embodiments detailed herein describe protection circuitry for a boost converter coupled between input and output nodes for driving a load coupled to the output node. In one aspect, the protection circuitry may comprise a first circuit configured for monitoring a voltage at the output node, the voltage being caused by a signal having a voltage proximate to, or lower than, an input voltage of the boost converter. The protection circuitry may further include a second circuit configured for coupling together the input node with respect to the output node and enabling the boost converter only if the monitored voltage exceeds a reference voltage. The boost converter may be an inductor-based boost converter.

The first circuit may comprise a unidirectional current source for generating the voltage at the output node. The unidirectional current source can cause the voltage at the output node to exceed the reference voltage when the output node is in a normal condition. The unidirectional current source may comprise a diode.

The load may have a voltage level at which the load exhibits a non-linear current-voltage characteristic, the voltage level being proximate to, or greater than, the level of an input voltage of the boost converter. The load may be an LED module having a forward voltage which is proximate to, or greater than, an input voltage of the boost converter. Alternatively, the load can be a battery or a device containing an undervoltage lockout circuit.

The protection circuitry may further comprise a third circuit configured for monitoring current flowing to the output of the boost converter, and controlling the second circuit to decouple the input node and the output node, and disable the boost converter for a fixed period if the monitored current exceeds a reference value.

In another aspect, the protection circuitry may comprise a first circuit configured for monitoring a unidirectional current to the output node, the current having a voltage proximate to, or lower than, an input voltage of the boost converter. The protection circuitry may also include a second circuit configured for coupling together the input node with respect to the output node and enabling the boost converter only if the monitored current is less than a reference value. The boost converter may be an inductor-based boost converter. The first circuit may comprise a unidirectional current source for providing the current toward the output node. The reference value of the unidirectional current source is sufficient to maintain the voltage level of the output proximate to or greater than the input voltage of the converter when the output node is in a normal condition. The unidirectional current source can comprise a diode. The load has a voltage level at which the load exhibits a non-linear current-voltage characteristic, the voltage level being proximate to, or greater than, the level of an input voltage of the boost converter. For example, the load is an LED module having a forward voltage which is proximate to, or greater than, an input voltage of the boost converter.

In another aspect, a method for protecting a boost converter coupled between input and output nodes for driving a load coupled to the output node is proposed. The method may comprise the steps of monitoring a voltage at the output node, the voltage being caused by a current signal having a voltage proximate to, or lower, than an input voltage of the boost converter; and coupling together the input node with respect to the output node and enabling the boost converter only if the monitored voltage exceeds a reference voltage. Alternatively, the method can comprise the steps of monitoring a unidirectional current to the output node, the current having a voltage proximate to, or lower, than an input voltage of the boost converter; and coupling together the input node with respect to the output node and enabling the boost converter only if the monitored current is less than a reference value.

Additional aspects and advantages of the present disclosure will become readily apparent to those skilled in the art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Examples of the subject matter claimed herein are illustrated in the figures of the accompanying drawings and in which reference numerals refer to similar elements and in which:

DESCRIPTION OF THE EMBODIMENT

The disclosure pertains to a protection of a DC/DC boost converter driving a load which, in this embodiment, has a voltage level at which the load exhibits a non-linear current-voltage characteristic. The voltage level is proximate to, or greater than, the level of an input voltage of the boost converter. For example, the load is an LED module in this embodiment which has a forward voltage proximate to, or greater than, the input voltage. This is why the boost converter is utilized in this embodiment to boost the input voltage.

Protection circuitry described herein is configured for protecting the boost converter against a short-circuit to ground at the anode of an LED module or a fault in the LED module which reduces the LED forward voltage to a level below the input voltage (the short-circuit and the fault in the LED module are referred to as "output fault" in this embodiment). Incidentally, persons skilled in the art would appreciate that the protection circuitry can also provide an LED over-current protection to the LED module if there is a transient over-voltage event of an input supply.

Figure 1:
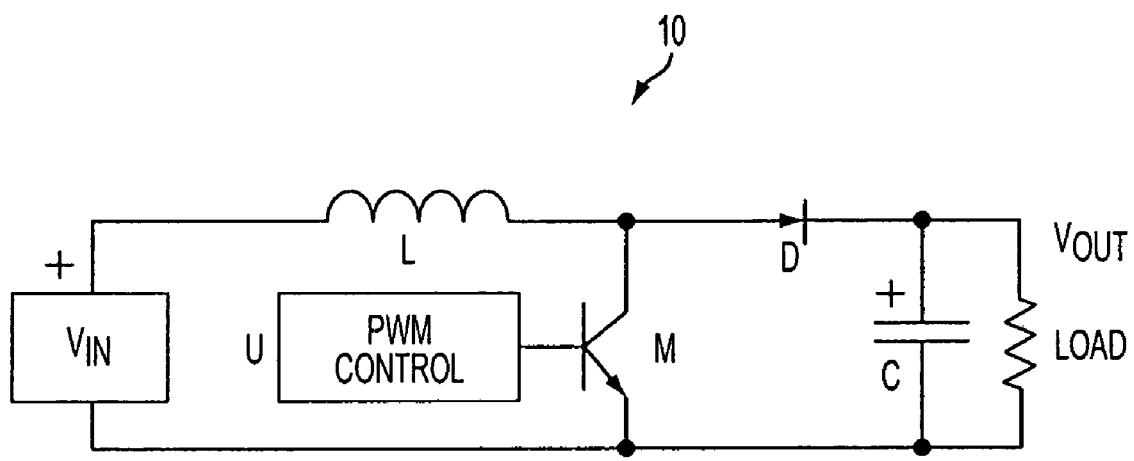
FIG. 1 is a circuit diagram showing a typical inductor based DC/DC boost converter.
Figure 2:
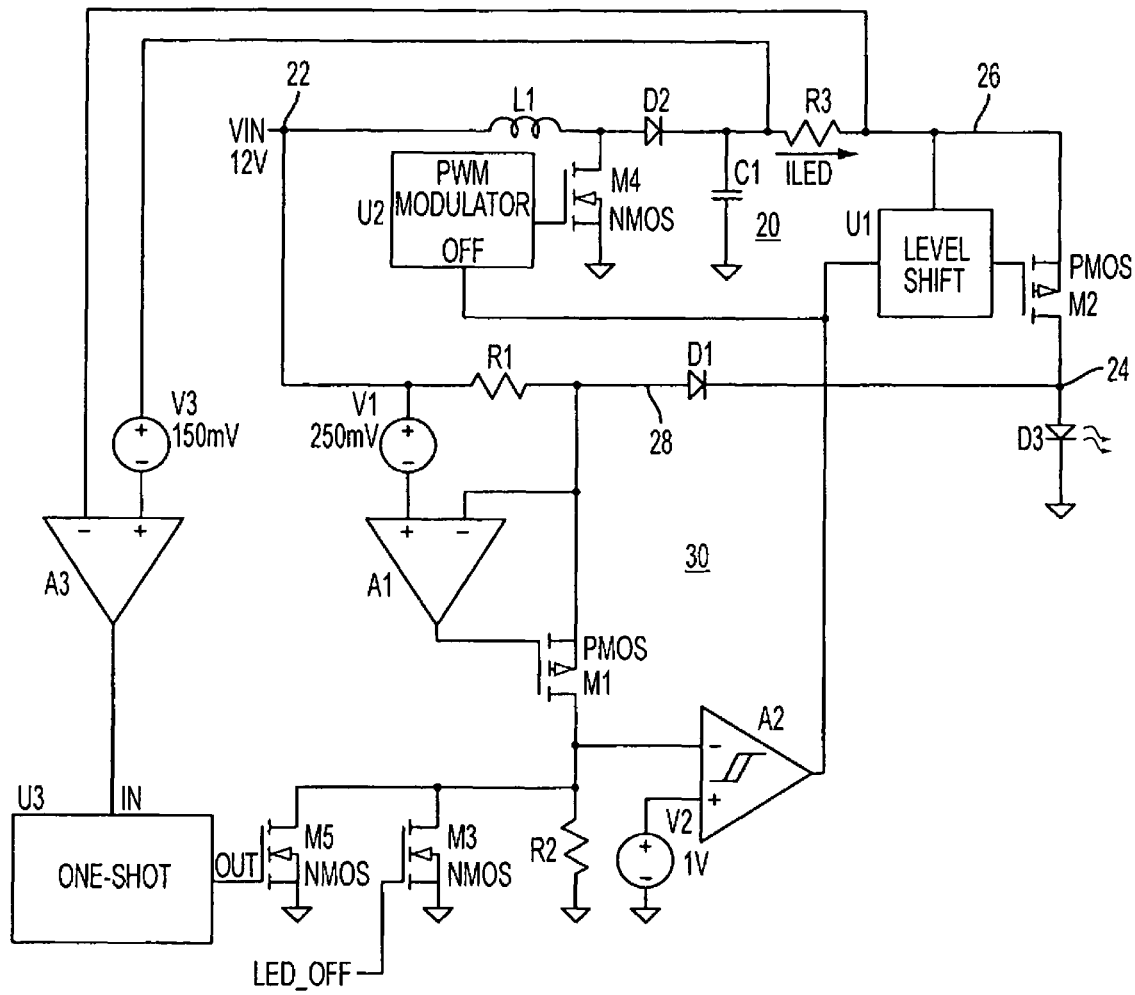
FIG. 2 is a circuit diagram showing protection circuitry for a DC/DC boost converter according to one embodiment of the disclosure.

FIG. 2 is a circuit diagram showing protection circuitry for a DC/DC boost converter according to one embodiment of the disclosure. Boost converter 20 in FIG. 2 may be an inductor-based boost converter which includes inductor L1, NMOS (switch) M4, diode D2, output capacitor C1, and PWM modulator U2 for controlling NMOS M4. Boost converter 20 is provided between input node 22 and output node 24 for driving LED module D3 coupled to the output node. LED module D3 comprising, for example, 10-series-connected LEDs, has a forward voltage proximate to, or greater than, input voltage $V_{IN}$, in this embodiment. Boost converter 20 controls power to drive LED module D3 through circuit path 26. An operation of the boost converter is not repeated for brevity.

Protection circuitry 30 for protecting boost converter 20 from the output fault may comprise resistor R1 (e.g., 2.2 kΩ), diode D1, amplifier A1, voltage source V1, PMOS M1, resistor R2 (e.g., 22 kΩ), voltage source V2, and comparator A2 for monitoring a voltage at output node 24. The voltage at output node 24 (the voltage used to detect the output fault) can be caused by a current flowing through circuit path 28 and having a voltage proximate to, or lower, than input voltage $V_{IN}$ of boost converter 20. The current to cause the voltage at output node 24 may be provided by a power source of boost converter 20 (or a system) or a separate power source. The protection circuitry may further include level shifter U1 and PMOS M2 for coupling together input node 22 with respect to output node 24 and enabling PWM modulator U2 only if the monitored voltage exceeds reference voltage $V_{REF}$ (e.g., 14V) which may be determined by the values of input voltage $V_{IN}$ (e.g., 12V), voltage source V1 (250 mV), and forward voltage $V_{f(D1)}$ of diode D1 (e.g., 0.5V) (this means that no output fault occurs). The reference voltage in this example can be defined as follows:

$$V_{REF} \geq V_{IN} - V_1 - V_{f(D1)}$$

In this embodiment, the power source for providing input voltage $V_{IN}$ to circuit paths 26 and 28 is common.

Protection circuitry 30 as shown in FIG. 2 can also monitor a unidirectional current which may be a current flowing through diode D1 for the purpose of detecting the output fault. The current has a voltage proximate to, or lower, than input voltage $V_{IN}$ of boost converter 20. Protection circuitry 30 can couple together input node 22 with respect to output node 24 and enable boost converter 20 only if the monitored current is less than a reference value which can be determined by, for example, the values of voltage source V1, resistor R1, voltage source V2, and resistor R2. Specifically, the reference value in this example may be defined as V1/R1−V2/R2. Only when the following condition is met $$I(D1) \leq V1/R1 - V2/R2,$$

PMOS M2 is turned on to couple together input node 22 with respect to output node 24, and PWM modulator U2 is activated. I(D1) is a current flowing through diode D1. The reference value of I(D1) is sufficient to maintain the voltage level of the output proximate to or greater than the input voltage of the converter when the output is in a non-faulted condition.

Protection circuitry 30 may further include resistor R3, voltage source V3, comparator A3, one-shot circuit U3, and NMOS M5 for monitoring current flowing through LED module D3, and controlling PMOS M2 to decouple input node 22 and output node 24, and disable PWM modulator U2, for a fixed period if the monitored current exceeds a reference value determined by voltage source V3.

It is noted that level-shifter U1 can be implemented by any known circuit configuration. For example, U.S. Patent Application Publication No. 2007/0257861 discloses an example of a level shifter, which is hereby incorporated by reference. In addition, MOSFETs are used in this embodiment. However, it is apparent to persons skilled in this art that, for example, bipolar transistors can be used to implement the disclosed embodiment, instead of MOSFETs.

When input voltage $V_{IN}$ is applied to input node 22 (e.g., when a system including boost converter 20 and protection circuitry 30 is turned on), protection circuitry 30 allows PMOS M2 and PWM modulator U2 to be turned on only when the voltage at output node 24 exceeds the reference voltage (e.g., $V_{IN}-V1-V_{f(D1)}$), or alternatively, the current through diode D1 is less than the reference value (e.g., V1/R1-V2/R2) for the purpose of the protection of boost converter 20 from the output fault.

There is no current flowing through diode D1 when input voltage $V_{IN}$ is applied to the input node. The positive input of amplifier A1 is, for example, 250 mV below its negative input by voltage source V1. Amplifier A1 then pulls the output, turning on PMOS M1. Accordingly, a current starts flowing through PMOS M1. This causes the current to flow through resistor R1, and then the current increases until the voltage across resistor R1 becomes equal to the voltage provided by voltage source V1. It is noted that amplifier A1 is a common operational amplifier which attempts to drive the output so that the inputs becomes equal to each other. Such an amplifier is commercially available, see, e.g., LT6106 "36V Low Cost High Side Current Sense in a SOT-23," manufactured by Linear Technology Corporation, and described in its corresponding datasheet, incorporated herein by reference. If there is no output fault, the voltage across resistor R1 is maintained equal to the voltage provided by voltage source V1 by amplifier A1, and the current flowing through diode D1 is substantially less than the current flowing through R1.

The current through resistor R1 excess of the current in D1 is sourced to resistor R2 through PMOS M1, and the voltage across resistor R2 is applied to the negative input of comparator A2 which compares that voltage with a reference voltage (e.g., 1V) provided by voltage source V2. When the voltage across resistor R2 is higher than the reference voltage provided by voltage source V2, the output of converter A2 becomes low, controlling level shifter U1 to turns on PMOS M2 and driving an OFF input of PWM modulator U2 to activate the modulator. This indicates that the voltage at output node 24 exceeds the reference voltage (or the current though diode D1 is less than the reference value). PMOS M2 and PWM modulator U2 remain ON as long as the voltage at the negative input of comparator A2 is maintained greater than the reference voltage provided by voltage source V2.

On the other hand, when output node 24 is not in a normal condition, diode D1 is forward-biased and a current flows through diode D1 to output node 24 when input voltage $V_{IN}$ is applied to input node 22. If the current flowing through diode D1 is enough to cause the 250 mV drop at resistor R1, the voltage at the negative input of amplifier A2 is far below that of the positive input. This causes the output of amplifier A1 to maintain positive, turning off PMOS M1. Accordingly, the voltage across resistor R2 does not exceed the voltage provided by voltage source V2, which maintain the output of converter A2 to be high. This does not allow PMOS M2 and PWM modulator U2 to be turned on. Boost converter 20 can be protected from the output fault.

When boost converter 20 is in a normal operation (no output fault), the voltage across LED module D3 is maintained higher than input voltage $V_{IN}$ by boost converter 20 regulating the current through the LED module. With the output voltage greater than $V_{IN}$, diode D1 is reverse-biased and conducts no current through circuit path 28. PMOS M1 with the gate controlled by amplifier A1, draws a steady current through resistor R1 such that the voltage across R1 is maintained equal to the voltage provided by voltage source V1. The current through resistor R1 is sourced to resistor R2 through PMOS M1, and the voltage across resistor R2 is applied to the negative input of comparator A2 which compares that voltage with the reference voltage provided by voltage source V2. Since the voltage across resistor R2 is maintained higher than the reference voltage provided by voltage source V2, the output of converter A2 is maintained low. Therefore, PMOS M2 and PWM modulator U2 remain turned on.

If the output fault occurs during operation (e.g., one of LEDs in LED module D3 is shorted to ground during operation and the voltage at output node 24 falls below input voltage $V_{IN}$), protection circuitry 30 can turn off PMOS M2 and PWM modulator U2 to isolate input voltage $V_{IN}$ from output node 24 to which the defective LED module is connected. When such an output fault occurs, diode D1 will be forward biased and start conducting current because the voltage at output node 24 is lower than the voltage level of input voltage $V_{IN}$. When the current through diode D1 impresses the voltage across resistor R1 equal to or exceeding the voltage provided by voltage source V1, then PMOS M1 no longer conducts current to the negative input of comparator A2. With little or no current sourced by PMOS M1, the voltage across resistor R2 becomes less than the voltage provided by voltage source V2 and the output of comparator A2 transitions high. When the comparator output transitions high, both PWM modulator U2 and PMOS M2 are turned off in order to protect boost converter 20 from the output fault. With PMOS M2 becoming high impedance, the output fault pulls additional current through diode D1, thus reinforcing the new stable state of PMOS M2 "OFF" and the modulator "OFF." If the output fault clears, the current sourced through diode D1 will quickly diminish and the flow of current through PMOS M1 to the negative input of comparator A2 will be reestablished. This allows the output of comparator A2 to be low, turning on PMOS M2 and PWM modulator U2 again.

In addition, the current flowing through LED module D3 is sensed by resistor R3 to determine if an overcurrent fault occurs. The voltage across resistor R3 is provided to the negative input of comparator A3, and the voltage provided by voltage source V3 (e.g., 150 mV) is applied to the positive input of the amplifier. When the voltage across resistor R3 exceeds the voltage provided by voltage source V3, the output of amplifier A3 becomes high and one shot circuit U3, triggered on the rising edge of the output of amplifier A3, outputs a pulse. NMOS M5 is turned on for a period determined by one shot circuit U3, pulling the current from PMOS M1. This lowers the voltage across resistor R2, and thus, the output of comparator A2 becomes high. Accordingly, PMOS M2 and PWM modulator U2 are turned off for the period determined by one shot circuit U3.

Protection circuitry 30 may further include NMOS M3 for dimming intensity of LED module D3. The gate of NMOS M3 receives a LED_OFF signal to control the output of the LED module. A technique implementing such a LED dimming circuit is commercially available, e.g., see LT3518 "Full-Featured LED Driver with 2.3 A Switch Current," manufactured by Linear Technology Corporation, and described in its corresponding datasheet, incorporated herein by reference.

When the LED_OFF signal is high, the negative input of comparator A2 is driven to ground by NMOS M3. PMOS M2 and PWM modulator U2 will then be turned off and the LED light will be extinguished. When the LED_OFF signal transitions low (provided that output node 24 is in a normal condition), PMOS M2 and PWM modulator U2 are turned on and LED module D3 promptly lights up.

It is noted that during operation, when input voltage $V_{IN}$ spikes higher than the output voltage causing LED module D3 to run current in excess of a regulated level, this current will be interrupted by PMOS M2 when the voltage drops across inductor L1, diode D2, and resistor R3 exceed the voltage level across resistor R1 and diode D1. Once interrupted, the supply voltage has to be decreased below the forward voltage level of LED module D3 in order to turn on PMOS M2 and PWM modulator U2.

Boost converter 20 can thus be protected from a transient supply over-voltage event or alternatively a fault where a portion of LED module D3 is shorted and remaining LEDs in the module provide an insufficient forward voltage for the boost converter to control the output current.

Figure 3:
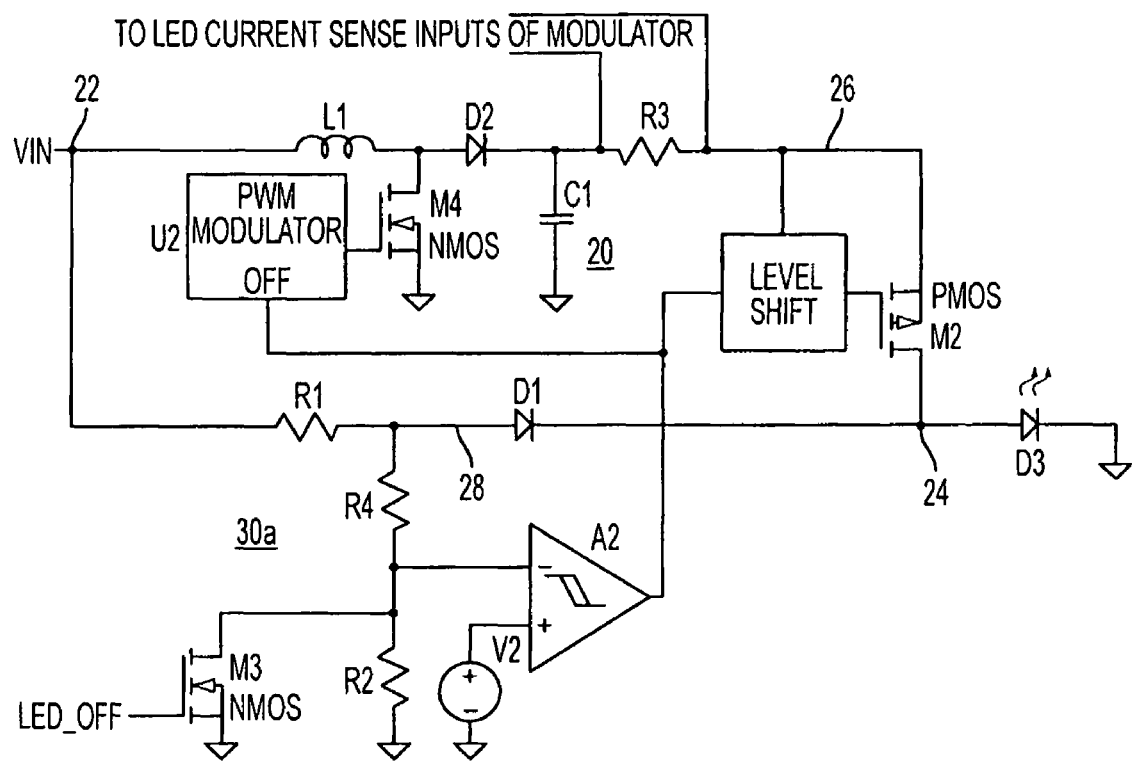
FIG. 3 is a circuit diagram showing protection circuitry for a DC/DC boost converter according to another embodiment of the disclosure.

FIG. 3 is a circuit diagram showing protection circuitry for a DC/DC boost converter according to another embodiment of the disclosure. FIG. 3 shows a simple configuration of protection circuitry 30a in which amplifier A1 and PMOS M1 in FIG. 2 are replaced with resistor R4. When output node 24 is in a normal condition (no output fault), diode D1 is reverse-biased and the current on circuit path 28 goes to the negative input of comparator A2 through resistors R1 and R4, causing the voltage across resistor R2 to be greater than the voltage provided by voltage source V2. Accordingly, the output of comparator A2 becomes low, turning on both PMOS M2 and PWM modulator U2. On the other hand, when output node 24 is not in a normal condition, diode D1 is forward-biased and the current on the circuit path 28 is pulled to output node 24. The voltage across resistor R2 thus becomes less than the voltage provided by voltage source V2, the output of comparator A2 becomes high. This turns off both PMOS M2 and PWM modulator U2 to protect boost converter 20 from the output fault.

Figure 4:
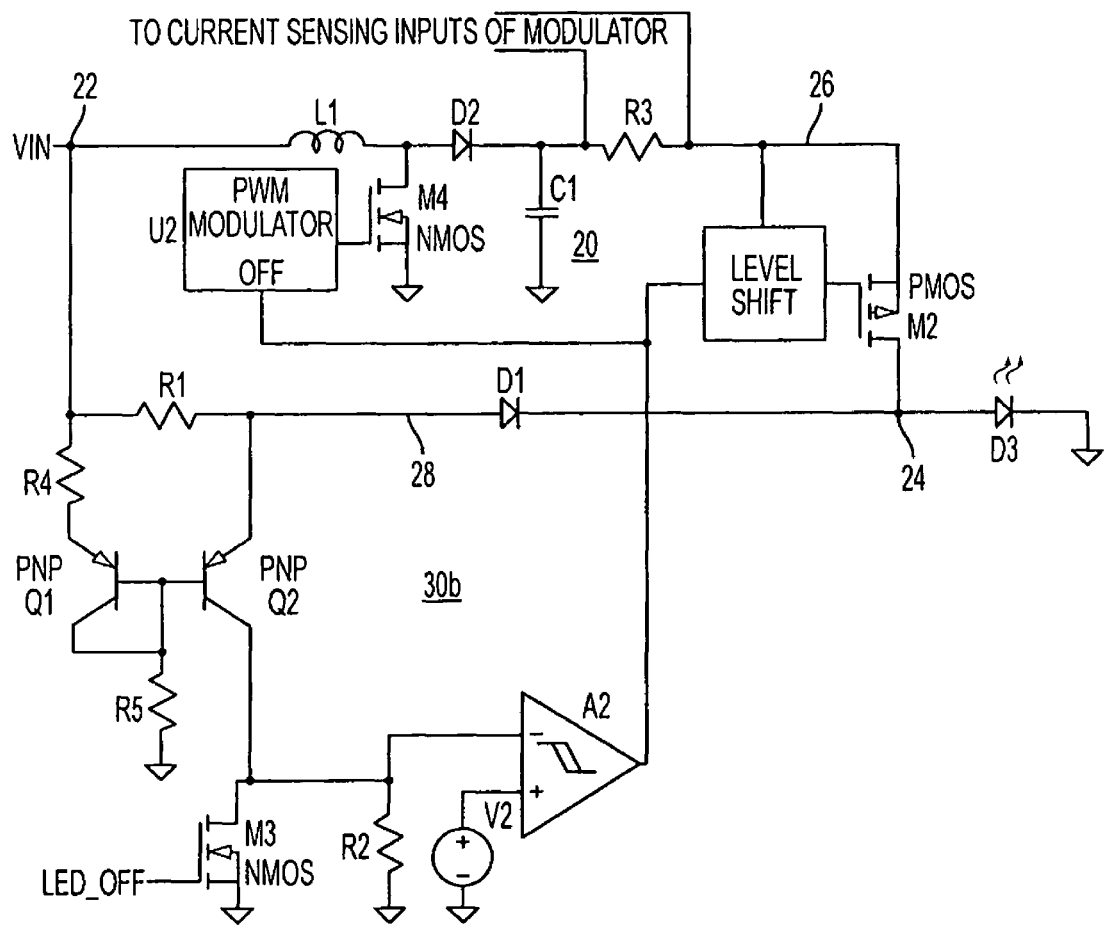
FIG. 4 is a circuit diagram showing protection circuitry for a DC/DC boost converter according to another embodiment of the disclosure.

FIG. 4 is a circuit diagram showing protection circuitry for a DC/DC boost converter according to another embodiment of the disclosure. In protection circuitry 30b in FIG. 4, PNP Q1, resistor R4, and current source R5 correspond to voltage source V1 in FIG. 2, and PNP Q2 corresponds to amplifier A1 and PMOS M1.

When there is little or no current flowing through diode D1 (normal condition), PNP Q2 pulls current through resistor R1. The current through resistor R1 increases until the voltage across resistor R1 becomes equal to the voltage across resistor R4. In this case, the voltage across resistor R2 becomes greater than the voltage provided by voltage source V2. The output of comparator A2 thus becomes low, turning on PMOS M2 and PWM modulator. On the other hand, when output node 24 is not in a normal condition, diode D1 is forward-biased and the current flows through diode D1 to output node 24. The increase of the current flowing through R1 to output node 24 causes PNP Q2 to stop flowing current. The voltage across resistor R2 thus becomes less than the voltage provided by voltage source V2. Therefore, because the output of comparator A2 becomes high, both PMOS M2 and PWM modulator U2 are turned off to protect boost converter 20 from the output fault.

An advantage of the present disclosure is that during a normal operation or during an output fault, the protection circuitry draws very little current from the input supply. Persons skilled in the art would appreciate that the protection circuitry can be configured to be turned off so as to draw no current from the input supply if the protection is not required, for example, by changing the setting of a chip including the protection circuitry.

LED module D3 is utilized as an example of the load in the above-described embodiments. However, the load is not limited to LED module D3. Any elements such as a battery or a device containing an undervoltage lockout circuit having a voltage level at which the load exhibits a non-linear current-voltage characteristic, can be used as a load of a boost converter. The undervoltage lockout circuit is well-known among persons skilled in the art, which can detect power applied from a boost converter and generate a reset signal placing a circuit into a known state of low power consumption.

Having described embodiments, it is noted that modifications and variations can be made by person skilled in the art in light of the above teachings. It is therefore to be understood that changes may be made in the particular embodiments disclosed that are within the scope and sprit of the disclosure as defined by the appended claims and equivalents.

What is claimed is:

1. Protection circuitry for a boost converter coupled between input and output nodes for driving a load coupled to the output node, the circuitry comprising:
   a first circuit path including the boost converter;
   a first circuit configured for monitoring a voltage at the output node, the first circuit including a second circuit path connected to the output node, and a current source configured for supplying unidirectional current to the output node through the second circuit path, the voltage at the output node being caused by the unidirectional current at a voltage level not exceeding the input voltage; and
   a second circuit including a switch in the first circuit path, the second circuit being configured for controlling the switch to couple together the input node with respect to the output node and enabling the boost converter only if the monitored voltage exceeds a reference voltage.

2. The protection circuitry according to claim 1, wherein the boost converter is an inductor-based boost converter.

3. The protection circuitry according to claim 1, wherein the current source causes the voltage at the output node to exceed the reference voltage when the output node is in a normal condition.

4. The protection circuitry according to claim 3, wherein the current source comprises a diode.

5. The protection circuitry according to claim 1, wherein the load has a voltage level at which the load exhibits a non-linear current-voltage characteristic, the voltage level being proximate to, or greater than, the level of an input voltage of the boost converter.

6. The protection circuitry according to claim 5, wherein the load is an LED module having a forward voltage which is proximate to, or greater than, an input voltage of the boost converter.

7. The protection circuitry according to claim 5, wherein the load is a battery.

8. The protection circuitry according to claim 5, wherein the load is a device containing an undervoltage lockout circuit.

9. The protection circuitry according to claim 1, further comprising a third circuit configured for monitoring current flowing to the output of the boost converter, and controlling the second circuit to decouple the input node and the output node, and disable the boost converter for a fixed period if the monitored current exceeds a reference value.

10. A method for protecting a boost converter in a first circuit path coupled between input and output nodes, the boost converter being configured for driving a load coupled to the output node, the method comprising the steps of:
    supplying unidirectional current to the output node through a second circuit path;
    monitoring a voltage at the output node, the voltage at the output node being caused by the unidirectional current at a voltage level not exceeding the input voltage; and
    controlling a switch in the first circuit path to couple coupling together the input node with respect to the output node and enabling the boost converter only if the monitored voltage exceeds a reference voltage.

* * * * *